(12) United States Patent
Schoemann et al.

(10) Patent No.: US 7,367,103 B2
(45) Date of Patent: May 6, 2008

(54) METHOD OF FORMING A VEHICLE COMPONENT

(75) Inventors: Michael P. Schoemann, Waterford, MI (US); Alan G. Dry, Grosse Pointe Woods, MI (US); Dennis Bunker, Clarkston, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 435 days.

(21) Appl. No.: 10/866,410

(22) Filed: Jun. 11, 2004

(65) Prior Publication Data

US 2005/0274452 A1 Dec. 15, 2005

(51) Int. Cl.
*B23P 25/00* (2006.01)
*B28B 7/22* (2006.01)

(52) U.S. Cl. .................. 29/527.1; 29/527.2; 264/255; 264/279; 264/275

(58) Field of Classification Search ............... 29/527.1, 29/527.2; 264/146.7, 255, 279, 275; 425/127
See application file for complete search history.

(56) References Cited

U.S. PATENT DOCUMENTS

| | | | | |
|---|---|---|---|---|
| 4,902,041 A | * | 2/1990 | Corbett et al. .............. | 280/807 |
| 4,904,014 A | * | 2/1990 | Azarovitz et al. ...... | 296/146.15 |
| 5,367,751 A | * | 11/1994 | DeWitt ........................ | 24/295 |
| 5,523,045 A | | 6/1996 | Kudert et al. | |
| 5,626,382 A | | 5/1997 | Johnson et al. | |
| 6,149,853 A | | 11/2000 | Luckett et al. | |
| 6,183,038 B1 | * | 2/2001 | Hansen et al. ........... | 296/146.7 |
| 6,348,169 B1 | * | 2/2002 | Stipes et al. ................ | 264/255 |
| 6,371,548 B1 | * | 4/2002 | Misaras .................... | 296/146.7 |
| 6,391,232 B1 | * | 5/2002 | Fritsch ...................... | 264/46.6 |
| 6,544,449 B1 | | 4/2003 | Gardner | |
| 6,565,142 B1 | | 5/2003 | Gibney, Jr. et al. | |
| 6,623,688 B2 | | 9/2003 | Gedritis et al. | |
| 6,672,650 B2 | * | 1/2004 | Winget .................... | 296/146.7 |
| 7,060,215 B2 | * | 6/2006 | Schoemann et al. ........ | 264/245 |
| 7,108,312 B2 | * | 9/2006 | Cowelchuk et al. ..... | 296/146.7 |
| 7,108,822 B2 | * | 9/2006 | Youngs et al. .............. | 264/255 |
| 7,128,450 B2 | * | 10/2006 | Tiesler et al. ............... | 362/487 |
| 7,244,383 B2 | * | 7/2007 | Youngs et al. .............. | 264/255 |
| 2003/0080582 A1 | | 5/2003 | Gibney, Jr. et al. | |
| 2004/0017023 A1 | | 1/2004 | Schoemann et al. | |
| 2004/0056382 A1 | * | 3/2004 | Shaner et al. ............... | 264/255 |
| 2005/0140167 A1 | * | 6/2005 | Jaggi ....................... | 296/146.7 |
| 2005/0140168 A1 | * | 6/2005 | Emerling ................. | 296/146.7 |
| 2005/0227042 A1 | * | 10/2005 | Cowelchuk et al. ........ | 428/137 |
| 2005/0227043 A1 | * | 10/2005 | Schoemann et al. ........ | 428/137 |
| 2005/0242619 A1 | * | 11/2005 | Schoemann et al. ..... | 296/146.7 |
| 2006/0026799 A1 | * | 2/2006 | Vanderpool et al. .......... | 16/412 |

(Continued)

*Primary Examiner*—Essama Omgba
(74) *Attorney, Agent, or Firm*—MacMillan, Sobanski & Todd, LLC

(57) ABSTRACT

A method of manufacturing a vehicle trim panel having a storage compartment includes providing a first mold assembly comprising a first mold section and a second mold section, wherein the first mold assembly defines a first cavity. A second mold assembly is provided and comprises a third mold section and a fourth mold section. The second mold assembly defines a second cavity. A first material is introduced into the first cavity, thereby producing a substrate. A second material is introduced into the second cavity, such that the second material defines a cover member. The substrate and the cover member define a vehicle trim panel, such that the cover member defines an expandable portion of the storage compartment.

19 Claims, 4 Drawing Sheets

U.S. PATENT DOCUMENTS

2006/0097544 A1* 5/2006 Cowelchuk et al. ..... 296/146.7
2006/0097545 A1* 5/2006 Cowelchuk et al. ..... 296/146.7
2006/0154027 A1* 7/2006 Dry ............................ 428/138
2006/0220274 A1* 10/2006 Dooley et al. .............. 264/259

* cited by examiner

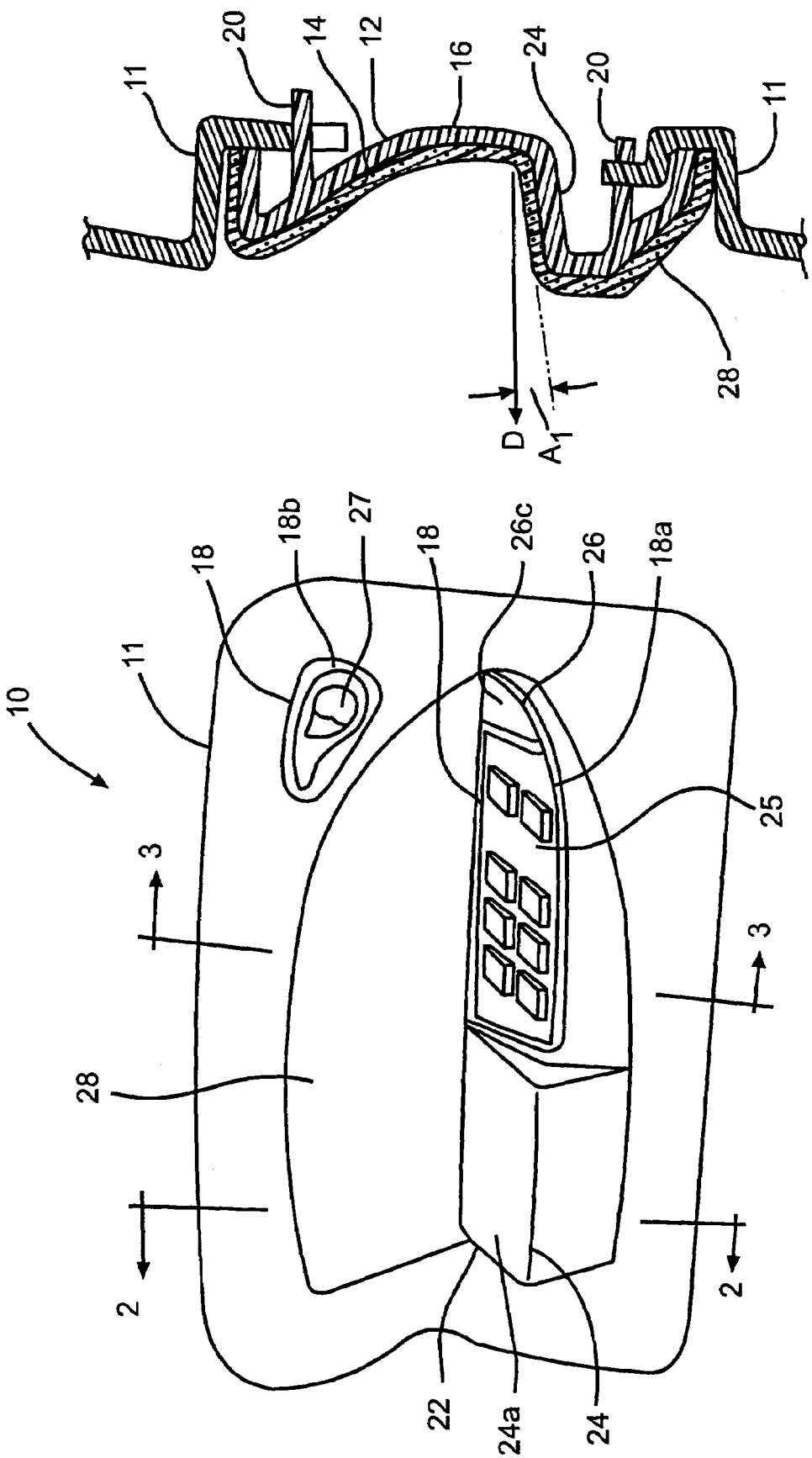

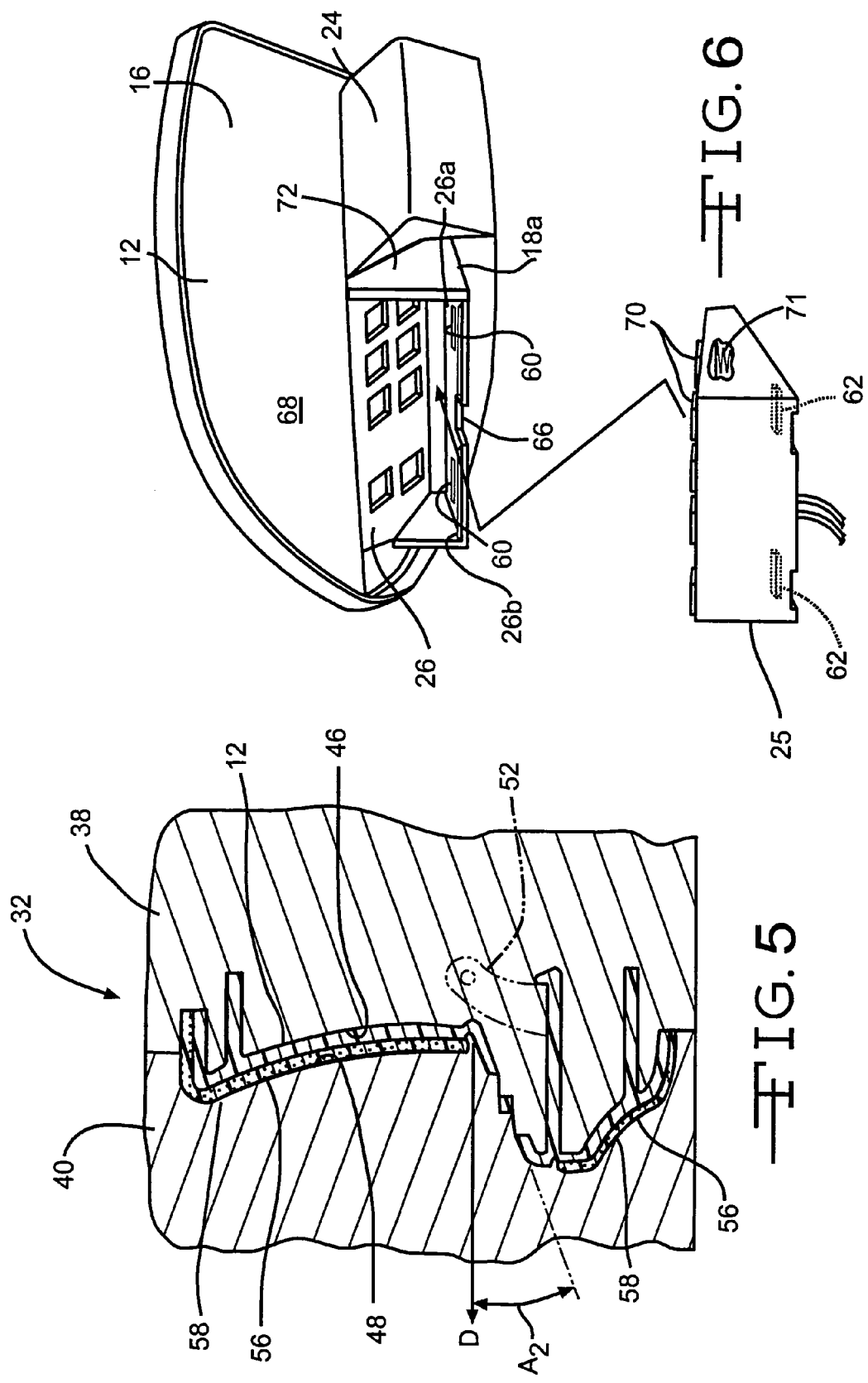

METHOD OF FORMING A VEHICLE COMPONENT

TECHNICAL FIELD

This invention relates to interior vehicle components. More particularly, the invention relates to a method of manufacturing a vehicle trim panel having an integrated bezel.

BACKGROUND OF THE INVENTION

It is known to provide an interior trim panel for a vehicle, and components thereof, which is aesthetically and/or tactilely pleasing to the vehicle occupants. Such trim panels may have a bezel disposed therein to allow for the placement of various door latch and switch assemblies within the trim panel.

Known bezels are typically formed separately from the trim panel and assembled to the trim panel during an assembly operation subsequent to forming the trim panel. Such assembly operations can be complex and time consuming. It would therefore be desirable to provide an improved method of manufacturing a bezel formed in an interior vehicle trim panel.

SUMMARY OF THE INVENTION

This invention relates to an improved method of manufacturing a vehicle trim panel having a integrated bezel for a door latch or switch assembly. The method includes providing a first mold assembly comprising a first mold section and a second mold section, wherein the first mold assembly defines a first cavity. A second mold assembly is provided and comprises a third mold section and a fourth mold section. The second mold assembly defines a second cavity. A first material is introduced into the first cavity, thereby producing a substrate and bezel. A second material is introduced into the second cavity, such that the second material defines a cover member. The substrate and the cover member define a vehicle trim panel having an integrated bezel.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is a plan view of a vehicle trim panel manufactured in accordance with the method of the invention.

FIG. 2 is a cross sectional view of the vehicle trim panel taken along line 2-2 of FIG. 1.

FIG. 5 is a schematic cross sectional view showing the cover member and the substrate illustrated in FIG. 1 in a second mold assembly used in accordance with the method of the invention.

FIG. 6 is a perspective view showing the switch assembly and the vehicle trim panel of FIG. 1 in accordance with the method of the invention.

DETAILED DESCRIPTION OF THE INVENTION

Figure 3:
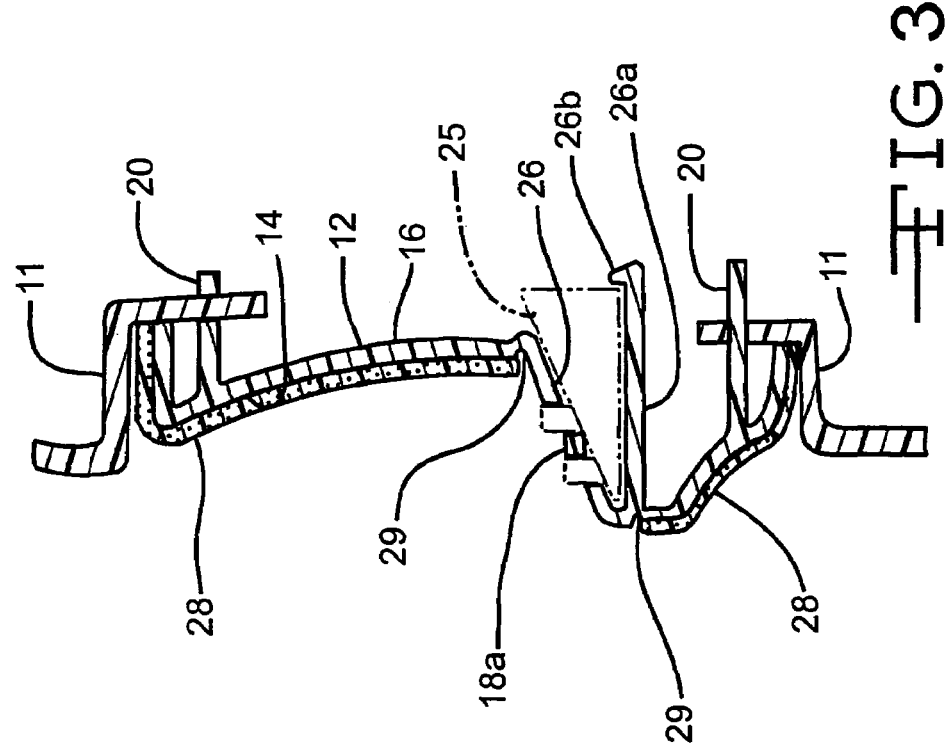
FIG. 3 is a cross sectional view of the vehicle trim panel taken along line 3-3 of FIG. 1.

Referring now to the drawings, there is illustrated in FIGS. 1 through 3, inclusive, a vehicle trim panel, generally shown at 10. In the exemplary embodiment illustrated, the trim panel 10 is an automotive door trim panel or bolster which mounts to a vehicle door assembly 11. It will be appreciated however, that the trim panel 10 of the subject invention may be any desired vehicle trim panel, such as a center console, an instrument panel, a cup holder, and the like. The illustrated trim panel 10 and vehicle door assembly 11 are, in large measure, conventional in the art and is intended merely to illustrate one environment in which this invention may be used. Thus, the scope of this invention is not intended to be limited for use with the specific structure for the trim panel 10 and vehicle door assembly 11 illustrated in FIGS. 1 through 3. On the contrary, as will become apparent below, this invention may be used in any desired environment for the purposes described below.

The door panel 10 includes a substrate 12. The substrate 12 includes an outer surface 14 and an inner surface 16. The outer surface 14 of the substrate 12 faces the interior of the vehicle (not shown) when the door panel 10 is mounted to the vehicle door assembly 11. The outer surface 14 may include at least one bezel 18 formed therein. As illustrated, the at least one bezel 18 includes a switch bezel 18a and a door latch bezel 18b, although such is not required. The inner surface 16 may include at least one mounting apparatus or stake 20 extending therefrom to facilitate mounting the door panel 10 to the vehicle door assembly 11. The substrate 12 may further define a flange 22. In a preferred embodiment, the flange 22 includes an armrest portion 24 and a bezel portion 26. As illustrated, the bezel portion 26 includes the switch bezel 18a. In a preferred embodiment, the bezel portion 26 may include a support portion 26a and at least one mounting tab 26b to facilitate the mounting of a switch assembly 25 or other structure within the bezel portion 26. It will also be appreciated that the door latch bezel 18b may include various tabs or apertures (not shown) to facilitate the mounting of a door latch assembly 27 within the door latch bezel 18b.

In a preferred embodiment, the armrest portion 24 and the bezel portion 26 may be formed such that an upper portion 24a of the armrest portion 24 and an upper portion 26c of the bezel portion 26 slope downwardly from the door panel 10 as the flange 22 extends outwardly from the door panel 10. A cover member 28 is attached to the substrate 12. Preferably, the cover member 28 is integrally molded to the substrate 12 according to the method of the invention, as will be described herein below. Preferably, the cover member 28 covers at least a portion of the outer surface 14 of the substrate 12. In a preferred embodiment, the cover member 28 extends over the outer surface 14 of the substrate 12, such that the armrest portion 24 of the flange 22 is covered by the cover member 28 and the switch bezel 18a and the door latch bezel 18b are exposed or not covered by the cover member 28. Thus, the switch bezel 18a and the door latch bezel 18b are visible from the interior of the vehicle (not shown). A groove 29 may be formed in the substrate 12 to surround each of the at least one bezel 18 to facilitate the formation of the cover member 28 surrounding each of the at least one bezel 18, as will be described below.

In the exemplary embodiment illustrated, the substrate 12 includes a switch bezel 18a and a door latch bezel 18b. It will be understood however, that the door panel 10 may include any number of bezels, including a single bezel, and that the at least one bezel 18 can have any desired shape, such as, for example, a substantially rectangular shape or substantially oval shape, and may have any desired number of openings or structures to accommodate the desired contents of the bezel.

Figure 4:
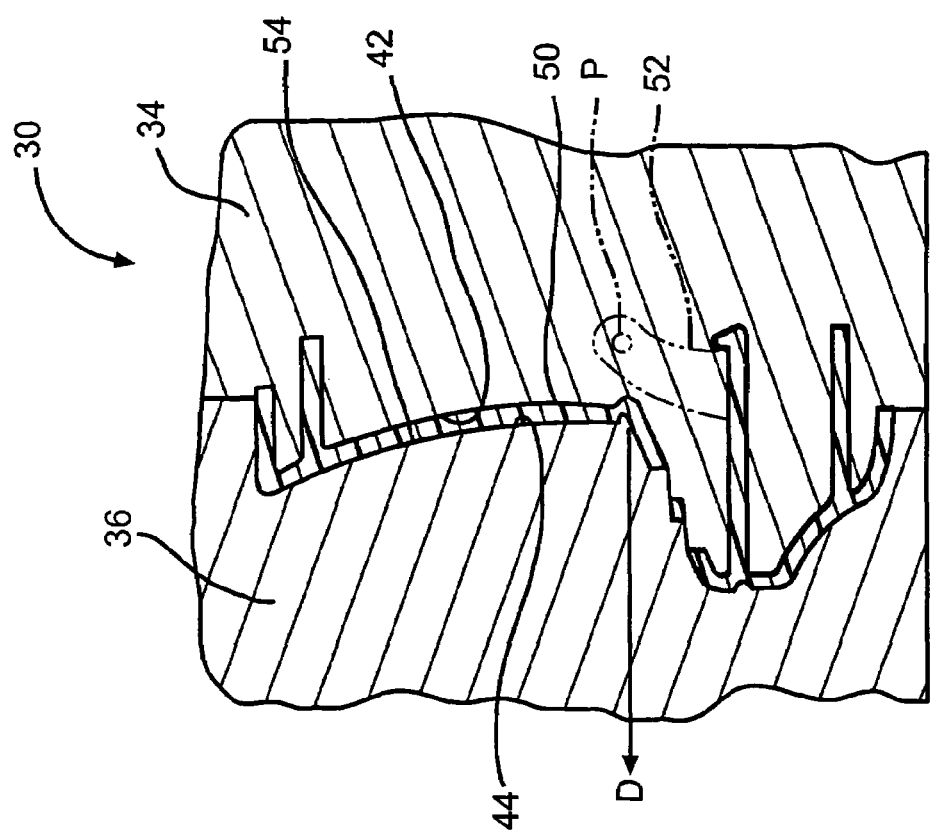
FIG. 4 is a schematic cross sectional view showing the substrate illustrated in FIG. 1 in a first mold assembly used in accordance with the method of the invention.

Referring now to FIGS. 4 and 5, there is illustrated a first mold assembly 30 and a second mold assembly 32, respectively, which are adapted to be used in accordance with the method of this invention. Preferably, the first mold assembly 30 includes a first mold section 34 and a second mold section 36, as shown in FIG. 4. The second mold assembly 32 includes a third mold section 38 and a fourth mold section 40, as shown in FIG. 5. Preferably, the first mold section 34 functions as the third mold section 38, as will be described herein. The first mold section 34 includes a first mold surface 42, the second mold section 36 includes a second mold surface 44, the third mold section 38 includes a third mold surface 46, and the fourth mold section 40 includes a fourth mold surface 48.

Although illustrated schematically in FIGS. 4 and 5, it will be appreciated that the mold surfaces 42, 44, 46, and 48 may be of any desired shape and contour. The mold sections 34, 36, 38, and 40 are preferably mounted to platens (not shown) of a press (not shown), such as a vertical molding press with sufficient tonnage to accomplish the method herein described.

The method of the invention will now be described. It will be appreciated, that in accordance with each embodiment of the invention as will be described below, a first step of the method of the invention includes providing a suitable mold assembly or assemblies, such as the mold assemblies 30 and 32, respectively illustrated in FIGS. 4 and 5.

A second step of the method of this invention is illustrated generally in FIG. 4. In the second step, the first mold assembly 30 is moved to a first closed position, as viewed in FIG. 4. In the first closed position, the first mold surface 42 of the first mold section 34 and the second mold surface 44 of the second mold section 36 define a first cavity 50. As is known in the art, the mold assembly could include movable mold portions, such as a side slide or lifter indicated schematically at 52, for creating the at least one mounting tab 26b while permitting the removal of the substrate 12 from the first mold section 34. The lifter 52 may be positioned as desired to form the at least one mounting tab 26b. A first material 54 is then introduced into the first cavity 50. Any desired material can be introduced into the first cavity 50 in any manner. Preferably the first material 54 is molten plastic, such as polypropylene or glass-filled polypropylene. In a preferred embodiment, the first material 54 is a high-crystalline polypropylene (HCPP). It will be understood that any other desired thermoplastic can be used. The first material 54 then conforms to the shape of the first cavity 50, thereby forming the substrate 12. Preferably, the second mold section 36 is then moved away from the first mold section 34 in a direction D and the substrate 12 remains on the first mold section 34, although such is not required. It will be appreciated that the first mold section 34 may also be moved away from the substrate 12 in a direction opposite the direction D, and to facilitate such movement, the lifter 52 may be moved to allow the substrate 12 to separate from the first mold section 34. As illustrated, the lifter 52 may pivot about a point P to allow the substrate 12 to be removed from the first mold section 34, although such is not required. It will be appreciated that the slope of the upper portion 24a of the armrest portion 24 and the upper portion 26c of the bezel portion 26 allow the first mold section 34 and the second mold section 36 to move away from the substrate 12 to release the substrate 12 from the first mold assembly 30. In a preferred embodiment, the slope of the upper portion 24a of the armrest portion 24 is approximately 7° less than the slope of the die draw direction D, although such is not required. In a preferred embodiment, the slope of the upper portion 26c of the bezel portion 26 is approximately 15° less than the slope of the die draw direction D, although such is not required.

A third step of the method of this invention is illustrated generally in FIG. 5. In the third step, the third mold section 38 and the fourth mold section 40 are moved into contact with one another and into a second closed position, thereby enclosing the substrate 12, and defining the second mold assembly 32. Preferably however, the substrate 12 remains in the first mold section 34 and the first mold section 34 comprises the third mold section 40, such that first mold section 34 and the fourth mold section 40 are moved into contact with one another and into the second closed position, thereby defining the second mold assembly 32.

In the second closed position, the outer surface 14 of the substrate 12, the third mold surface 46 of the third mold section 38 and the fourth mold surface 28 of the fourth mold section 40 define a second cavity 56. A second material 58 is then introduced into the second cavity 56. Any desired material can be introduced into the second cavity. Preferably, the second material 56 is molten plastic. More preferably, the second material 56 is a flexible material, such as a thermoplastic elastomer (TPE), thermoplastic elastomer-ether-ester (TEEE), or ethylene propylene diene monomer (EPDM). It will be understood that any other desired materials, such as other elastomers and non-elastomers, can be used. The second material 58 then conforms to the shape of the second cavity 56, thereby forming the cover member 22.

In a preferred embodiment, the groove 29 has been formed to surround each of the at least one bezel 18. The groove 29 and the fourth mold section 40 cooperate to prevent the second material 58 from covering each of the at least one bezel 18.

Preferably, the cover member 28 becomes thermally bonded to the substrate 12 during the molding process to form the door panel 10. However, it will be appreciated that the cover member 28 and the substrate 12 may be thermal bonded and/or chemical bonded to one another, although such is not required. For example, features, such as recesses and protrusions, can be provided on a mold surface, such as the second mold surface 44 of the second mold section 36 to form corresponding recesses and protrusions in the outer surface 14 of the substrate 12. Such recesses and protrusion will provide a mechanical bond with the cover member 28 after the molten second material hardens to form the cover member 28. Alternately, holes or recesses can be formed in the substrate 12, such that the second material 58 fills the recesses. The second material 58 thereby becomes bonded to the substrate 12 when the second material 58 hardens within the recesses.

The third mold section 38 and the fourth mold section 40 are then moved away from one another and the door panel 10 is removed from the second mold assembly 32. It will be appreciated that the method of the invention can be performed with satisfactory results in a shuttle-mold wherein the second and fourth mold sections 36 and 40 move relative to a stationary first mold section 34. The method of the invention can also be performed with satisfactory results in a shuttle-mold wherein the first mold section 34 moves relative to stationary second and fourth mold sections 36 and 40, or wherein the all mold sections 34, 36, 38, and 40 move relative to one another.

Referring now to FIG. 6, the switch assembly 25 is installed within the switch bezel 18a. In addition to the at least one mounting tab 26b, various apertures or tabs 60 may be formed on or in the bezel portion 26a to facilitate the mounting of the switch assembly 25 to the bezel portion 26. The apertures or tabs 60 may be formed by the lifter 52 in a manner similar to that described for the at least one tab 26b or by any other known molding method. The switch assembly 25 may include various apertures or tabs 62, which cooperate with the at least one tab 26b and the apertures or tabs 60 to retain the switch assembly 25 within the switch bezel 18a. The bezel portion 26 may also include an aperture 66 to accommodate a wire harness of the switch assembly 25 when the switch assembly 25 is positioned within the switch bezel 18a, although such is not required. Additionally, the upper portion 26c of the bezel portion 26 may include at least one aperture 68 formed therethrough to accommodate a respective one of at least one switch 70 extending from the switch assembly 25. In a preferred embodiment, each of the at least one switch 70 may be mounted to the switch assembly 25 to have a spring-load on each of the at least one switch 70, such that each of the at least one switch 70 is spring-loaded to extend outwardly from the switch assembly 25.

In a preferred embodiment, an upper surface 25a of the switch assembly 25 is sloped at an angle approximately equal to the slop of the upper portion 26c of the bezel portion 26. The support portion 26a and the upper portion 26c of the bezel portion 26 form a loading bin 72. When the switch assembly 25 is loaded from the inner surface 16 of the substrate 12 into the loading bin 72 of the bezel portion 26 in a direction approximately equal to the direction D relative to the substrate 12, the at least one switch 70 may be depressed by the upper portion 26c of the bezel portion 26 as the switch assembly 25 enters the switch bezel 18a. Preferably, once the switch assembly 25 is aligned within the switch bezel 18a, each of the at least one switch 70 will align with a respective one of the at least one aperture 68 and each of the at least one switch 70 will be urged through the respective one of the at least one aperture 68 by at least one spring 71 biasing each of the at least one switch 70 outward from the switch assembly 25. Thus, each of the at least one switch 70 snaps into each respective one of the at least one aperture 68. The slope of the upper portion 26c of the bezel portion 26 allows the switch assembly 25 to enter the switch bezel 18a without interference between the at least one switch 70 and the bezel portion 26.

The door panel 10 may be attached to the vehicle door assembly 11 using the stakes 20, if the stakes 20 were formed as part of the substrate 12, or by any suitable attachment method.

Figure 7:
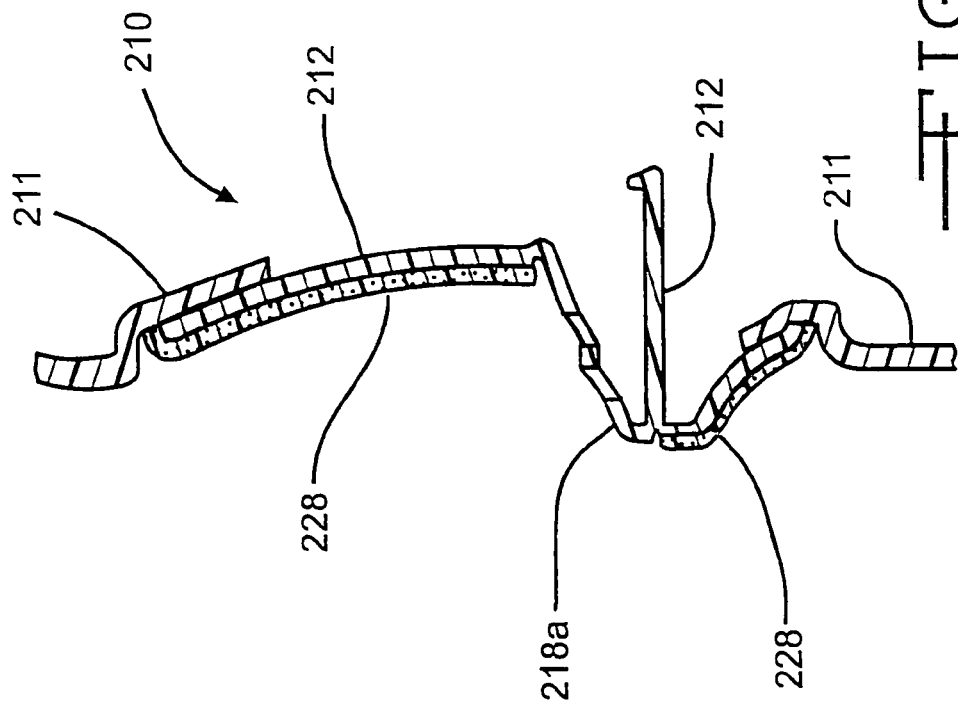
FIG. 7 is a cross sectional view of a first alternate embodiment of a vehicle trim panel manufactured in accordance with the method of the invention.

Referring now to FIG. 7, there is illustrated a second embodiment of a door panel 110, in accordance with the present invention. The illustrated door panel 110 is, in large measure, conventional in the art and are intended merely to illustrate one environment in which this invention may be used. Thus, the scope of this invention is not intended to be limited for use with the specific structure for the door panel 110 illustrated in FIG. 7 or with door panels in general. On the contrary, as will become apparent below, this invention may be used in any desired environment for the purposes described below. The door panel 110 may be any interior vehicle component, such as an instrument panel, door panel, center console, seat assembly, armrest, visor, and other various interior panels for covering the sides, ceilings, vertical pillars of the frame members of the vehicle or any other component located within the interior of a vehicle.

The door panel 110 is similar to the door panel 10 and generally only the components that differ will be described herein. Many of the components of the first embodiment of the door panel 10 as illustrated in FIGS. 1 through 6 are similar in structure and function to corresponding components of the second embodiment of the door panel 110 as illustrated in FIG. 7. Therefore, such corresponding components are indicated by similar reference number in these Figures, but with the components of the second embodiment of the door panel 110 having the addition of 100 to each reference number.

The door panel 110 is made in accordance with a second embodiment of the method of the invention. According to the second embodiment of the method, the substrate 112 is formed so that the substrate 112 comprises at least a portion of the vehicle door assembly. The substrate 112 may be mounted to the vehicle or another portion of the vehicle door assembly (not shown). In a preferred embodiment, a cover member 128 is formed so that the cover member 128 extends over an outer surface 114 of the substrate 112, such that a switch bezel 118a and an outer portion 180 surrounding the cover member 128 are exposed or not covered by the cover member 128. Thus, the switch bezel 118a and the outer portion 180 of the substrate 112 are visible from the interior of a vehicle when the door panel 110 is mounted to the vehicle.

Preferably, the door panels 10 and 110 are manufactured using a two-shot molding process. The two-shot molding process may be accomplished by rotating the first mold section 34, such as in a rotational molding process. In such a rotational molding process, the substrate 12 or 112 is first injection molded in the first mold assembly 30 as described herein. The first mold section 34, containing the substrate 12 or 112 is then rotated to a second position wherein the first mold section 34 is joined with the fourth mold section 40 to define the second mold assembly 32 and the second cavity 56. The cover member 28 is then injection molded in the second cavity 56. Alternately, two separate molds could be used sequentially to form the substrate 12 and the cover member 28.

Figure 8:
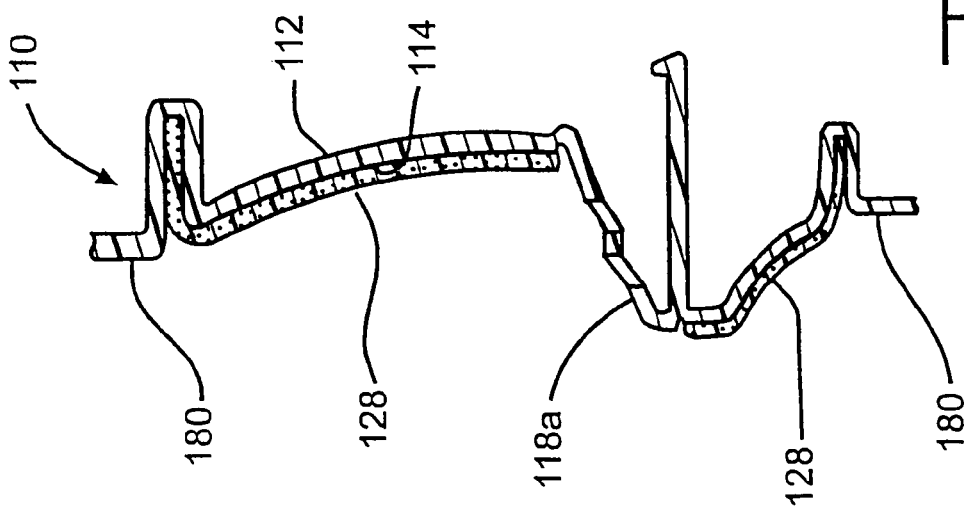
FIG. 8 is a cross sectional view of a second alternate embodiment of a vehicle trim panel manufactured in accordance with the method of the invention.

Referring now to FIG. 8, there is illustrated a third embodiment of a door panel 210 attached to a vehicle door assembly 211, in accordance with the present invention. The illustrated door panel 210 and vehicle door assembly 211 are, in large measure, conventional in the art and are intended merely to illustrate one environment in which this invention may be used. Thus, the scope of this invention is not intended to be limited for use with the specific structure for the door panel 210 and vehicle door assembly 211 illustrated in FIG. 8 or with interior vehicle components in general. On the contrary, as will become apparent below, this invention may be used in any desired environment for the purposes described below. The door panel 210 may be any interior vehicle component, such as an instrument panel, door panel, center console, seat assembly, armrest, visor, and other various interior panels for covering the sides, ceilings, vertical pillars of the frame members of the vehicle or any other component located within the interior of a vehicle.

The door panel 210 is similar to the door panel 10 and generally only the components that differ will be described herein. Many of the components of the first embodiment of the door panel 10 as illustrated in FIGS. 1 through 6 are similar in structure and function to corresponding components of the third embodiment of the door panel 210 as illustrated in FIG. 8. Therefore, such corresponding components are indicated by similar reference number in these Figures, but with the components of the third embodiment of the door panel 110 having the addition of 200 to each reference number.

At least a portion of the vehicle door assembly 211 is formed in accordance with the method of this invention, as described for the substrate 12. A substrate 212 may then be formed, such that the substrate 212 is thermally and/or chemically bonded to the vehicle door assembly 211. A cover member 228 is then formed on the substrate 212 in a manner similar to that described for the formation of the cover member 28. Preferably, the door panel 210 and vehicle door assembly 211 are manufactured using a three-shot molding process. The three-shot molding process may be accomplished by rotating a first mold section, such as in a rotational molding process. In such a rotational molding process, at least a portion of the vehicle door assembly is first injection molded in a first mold assembly. The first mold section, containing the door assembly 211 is then rotated to a second position wherein the first mold section is joined with a fourth mold section to define a second mold assembly and a second cavity. The substrate 212 is then injection molded in the second cavity. The first mold section, containing the door assembly 211 and substrate 212 is then rotated to a second position wherein the first mold section is joined with the fifth mold section to define a third mold assembly and a third cavity. The cover member 228 is then injection molded in the third cavity. Alternately, three separate molds could be used sequentially to form the door assembly 211, the substrate 212 and the cover member 28. It will be appreciated that the portion of the door assembly 211 to be thermally and/or chemically bonded to the substrate 212 may be formed by any process and then disposed within a mold cavity such that the substrate 212 is formed on the door assembly 211 in accordance with the invention.

It will be further appreciated that the method of forming the door panels 10, 110, and 210 of the invention can be satisfactorily performed wherein the cover member 28 is formed prior to the substrate 12.

The method of forming a vehicle door panel 10, 110, or 210 having an integrated bezel 18, 118, or 218 as described herein, is advantageous over prior art designs. The method of forming a vehicle door panel 10, 110, and 210 is advantageous because the two-shot molding process eliminates the manual assembly of a cover member to a door panel required by the prior art methods. The method of the invention further improves quality, and eliminates the multiple components, such as support frames, fasteners, adhesives, and the like, of known vehicle trim panels.

The principle and mode of operation of this invention have been described in its preferred embodiments. However, it should be noted that this invention may be practiced otherwise than as specifically illustrated and described without departing from its scope.

What is claimed is:

1. A method of manufacturing a vehicle trim panel having an integrated bezel, the method comprising the steps of:
   a. providing a first mold assembly comprising a first mold section and a second mold section, the first mold assembly defining a first cavity;
   b. introducing a first material into the first cavity, thereby producing a substrate, an integrated bezel, and a groove surrounding the integrated bezel;
   c. providing a second mold assembly comprising a third mold section and a fourth mold section that cooperates with the groove the second mold assembly defining a second cavity; and
   d. introducing a second material into the second cavity, the second material defining a cover member, wherein the substrate and the cover member define a vehicle trim panel.

2. The method according to claim 1, wherein the first mold section defines one of the third mold section and the fourth mold section.

3. The method according to claim 1, wherein the second mold assembly and the substrate disposed therein define the second cavity.

4. The method according to claim 1, wherein the cover member extends about a surface of the substrate.

5. The method according to claim 1, wherein the cover member exposes the bezel.

6. The method according to claim 1, further including attaching the substrate to an interior vehicle component.

7. The method according to claim 1, wherein the cover member is thermally bonded to the substrate to form the vehicle trim panel.

8. The method according to claim 1, wherein the cover member is mechanically bonded to the substrate to form the vehicle trim panel.

9. The method according to claim 1, wherein the first material is different from the second material.

10. The method according to claim 1, wherein the fourth mold section defines the second mold section, wherein the second mold section includes a movable portion, wherein the movable portion of the second mold section is movable between a first position to obstruct the second cavity, and a second position to expose the second cavity, wherein prior to step (b), positioning the movable portion in its first position, and wherein prior to step (d), positioning the movable portion in its second position.

11. The method according to claim 10, wherein the third mold section defines the first mold section.

12. The method according to claim 1, wherein the vehicle trim panel comprises a door panel.

13. The method according to claim 1, wherein the method further includes the following steps:
   e. providing a switch assembly having a wireharness and at least one switch; and
   f. inserting a switch assembly into the bezel such that the wireharness extends through a first side of the bezel and the at least one switch extends through a second side of the bezel.

14. The method according to claim 13, wherein each of the at least one switches is spring loaded, such that each of the at least one switches extends through a corresponding opening through the bezel when the switch assembly is inserted within the bezel.

15. The method according to claim 13, wherein the bezel defines an outwardly extending flange portion for retaining the switch assembly within the bezel.

16. The method according to claim 15, wherein an upper portion of the bezel is sloped downwardly from the trim panel as the upper portion extends outwardly from the door panel and an upper surface of the switch assembly is correspondingly sloped, such that the switch assembly may be slidingly inserted within the bezel.

17. The method according to claim 13, wherein the bezel includes at least one opening corresponding respectively to the at least one switch.

18. The method according to claim 1, wherein the method further includes the following steps:
  e. providing a door latch assembly having a door latch; and
  f. inserting a door latch assembly into the bezel such that the door latch extends through a first side of the bezel.

19. A method of manufacturing a vehicle trim panel and bezel assembly, the method comprising the steps of:
  a. molding a substrate having an integrated bezel including at least one opening and a groove surrounding the integrated bezel;
  b. molding a cover member onto the substrate about the groove such that the cover member is bonded to at least a portion of the substrate to define a vehicle trim panel;
  c. providing a bezel assembly having at least one of a switch and a door latch; and
  d. inserting the bezel assembly into the bezel such that the at least one of the switch and the door latch extends into the at least one opening of the bezel to define a vehicle trim panel and bezel assembly.

\* \* \* \* \*